May 20, 1924.  
E. W. JONES  
BABBITTING DEVICE  
Filed June 14, 1921　　2 Sheets-Sheet 1
1,494,748
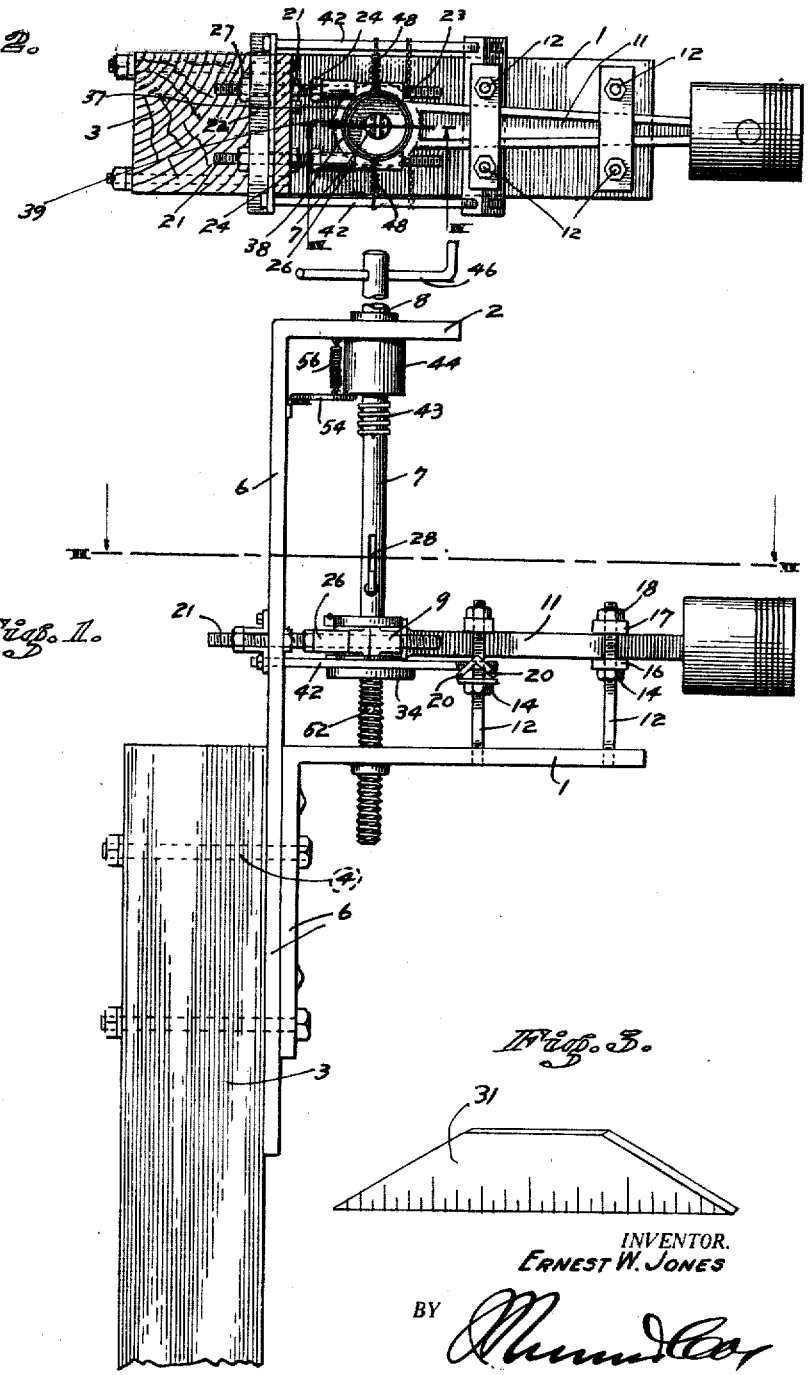
INVENTOR.  
ERNEST W. JONES  
BY  
ATTORNEY.

May 20, 1924.
E. W. JONES
BABBITTING DEVICE
Filed June 14, 1921
1,494,748
2 Sheets-Sheet 2
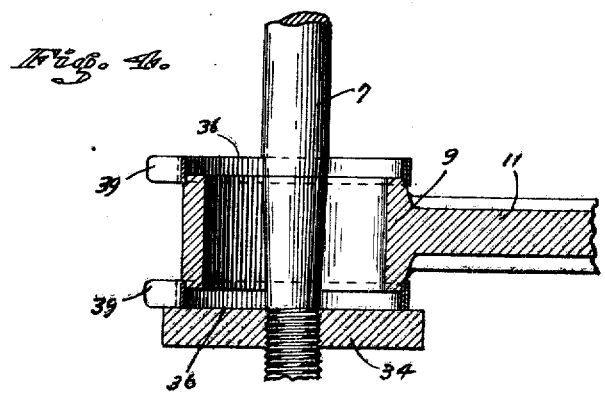
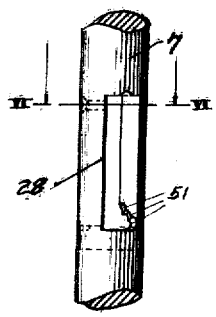
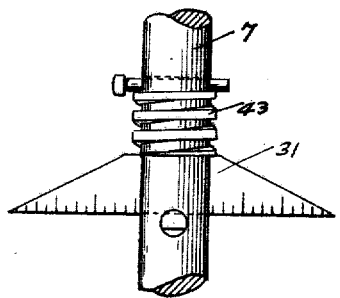
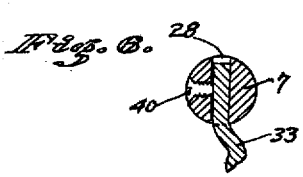
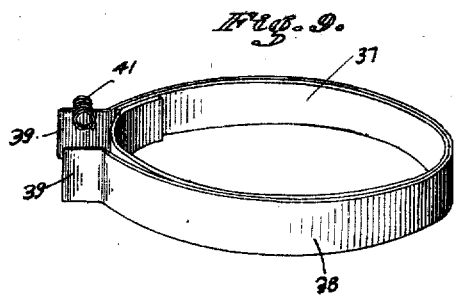
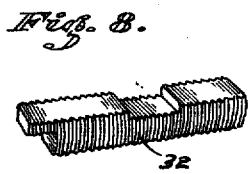
INVENTOR.
ERNEST W. JONES
BY
ATTORNEY.

Patented May 20, 1924.

1,494,748

UNITED STATES PATENT OFFICE.

ERNEST W. JONES, OF SAN JOSE, CALIFORNIA, ASSIGNOR TO AUTOMATIC BEARING MACHINE CO., A CORPORATION.

BABBITTING DEVICE.

Application filed June 14, 1921. Serial No. 477,405.

*To all whom it may concern:*

Be it known that I, ERNEST W. JONES, a citizen of the United States, and resident of San Jose, county of Santa Clara, and State of California, have invented a new and useful Babbitting Device, of which the following is a specification.

The present invention relates to improvements in babbitting, boring and scraping machines adapted to be used in re-babbitting worn out bearings of automobile connecting rods or the like. Its principal object is to provide a simple machine of the character described of convenient size, such as can be easily handled by the owner of a small automobile repair shop, which will enable the latter to re-babbitt the bearing in a short time and to get the bore shaped and polished to answer all the requirements of the bearing. The device I wish to secure Letters Patent on is now in successful operation and enables me to re-babbitt a bearing in about 30 or 40 minutes and to get it in such shape that I hardly ever have to do any adjusting after the machine has performed its work.

The principles involved in my invention are embodied in the mechanism illustrated in the accompanying drawing, in which Figure 1 represents a side view of my device, Figure 2 a sectional view along line 2—2 of Figure 1, Figure 3 a perspective view of a planing tool used in connection with my device, Figure 4 an enlarged sectional view through the principal working parts of my device along line 4—4 of Figure 2, Figure 5 a detail view of a scraping and boring tool, shown in its position in a shaft used in my device, Figure 6 a cross-section through said tool and shaft along line 6—6 of Figure 5, Figure 7 an enlarged detail view showing the manner of securing the planing tool shown in Figure 3 in the shaft mentioned before, Figure 8 a detail view of a boring tool used in connection with my device, and Figure 9 a detail view of a spring collar used in connection with my device.

Referring to the drawings in detail, I show my babbitting device as being supported between two strong horizontal steel plates (1) and (2) placed vertically above each other and firmly secured to a post (3) by means of bolts (4) penetrating said post and vertical members (6) which are integral parts of the horizontal plates. In this manner I secure freedom of access all around my device. The plates should be perfectly level and the vertical members perpendicular. Through these two plates extends the vertical shaft (7), the lower end of which is threaded and screws into the lower plate while the upper end is rotatably and slidably secured in a proper bearing (8) in the upper plate. Around this shaft the bearing container (9) at the end of the connecting rod (11) is secured in the following manner. Four studs (12) are screwed into the bottom plate in the four corners of a rectangle, each having a threaded top, to which nuts (14) are secured. Each two of the studs form a pair and the pair farthest away from the shaft has a metal strip (16) resting on the nuts 14, a second metal strip (17) being provided above the first strip, with a nut (18) secured on each stud above the second plate, by means of which the two plates can be pressed together and clamped on the connecting rod placed between them at any elevation desired. The clamping means held by the other pair of studs (12) differs from the one described in the fact that between the lower plate and the connecting rod an angle iron (20) is used, which toes downward and the heel of which is provided with holes through which the bolts (12) extend.

The connecting rod and bearing container are further adjusted by two horizontal rods (21) secured between two horizontal angle irons (22) fastened to the vertical member (6) on a plane with the connecting rod. The two ends of these rods are adapted to fit into the holes provided in the bearing container for the reception of bolts binding the two halves of the same together and are provided with holes adapted to receive pins (23) for locking the rods in the bearing containers. A nut (24) is provided on the rod adapted to be screwed against the bearing container so that the same is firmly clamped between the pin and the nut. To secure easier access to the nut I interpose a sleeve (26) between the nut and the bearing container. I also place a thin layer of cardboard between the two halves of the bearing container. The rod (21) is adjustably secured between the angle irons by means of suitable nuts (27).

The shaft (7), the lower end of which has a left-handed thread, is provided with a slot (28) for the reception of diverse tools to be used in connection with the finishing of the bearing. I show three of these tools in my drawing, the planing and bevelling tool (31), the boring tool (32) and the boring and shaving tool (33), the particular uses of which will be described hereafter. Between the lower plate and the bearing I provide a large washer (34) having an internal thread. I also use in the babbitting operation two spring collars (36), one of which is shown in detail in Figure 9. It consists of an inner spring (37) and an outer spring (38). The inner spring is somewhat longer than the outer one and adapted to be pressed into circular form by the latter which, when expanded, does not quite complete a circle, but may be made to approach and complete the full circle by pressing together the two flanges (39). The latter two are secured to each other at any desired distance by a spiral spring (41), which is fastened to one of the flanges and may be slipped over the other one so as to hold the same at the desired distance.

To brace the studs (12) I use two rods (42) one end of which is secured in the vertical member (6) or the angle irons secured thereto, while the other end is secured in the angle iron (20) supporting the connecting rod, so that the whole forms a firm structure offering no chance whatever for any vibration of the connecting rod or the bearing container while the bearing is being formed. A spring (43) slidable on the shaft (7), a plurality of auxiliary tubes (44) secured near the top of the shaft so as to be out of the way when not used and a handle (46) for turning the rod complete the apparatus, which is operated as follows:

Insert the connecting rod between the two plates of the first pair of rods (12) and between the angle and the plate of the second pair of rods so that the one half of the bearing container forming part of the connecting rod is approximately in its right place around the shaft (7). Place the other half against it so as to enclose the shaft completely, the sheets of cardboard having been interposed. Insert the rods (21) through the bolt holes of the bearing container, securing them at the outer end by the pin (23), which is chained to the bracing rod (42) and adjust the bearing container so as to make it concentric with the shaft. In this operation the bevelling tool (31) may be used, which may be inserted, bevelled edge down, in the slot (28), adjusted in the same by means of the scale on the same and then lowered into the bearing container by turning the shaft (7), when its bevelled edge will make contact with the edge of the bearing container and center the latter.

After the bearing container has been properly centered, it is firmly secured in its place by tightening the various nuts holding the same. One of the spring collars (36) is placed on top of the bearing, tightened to a desired degree so as to allow a proper flange to be molded on top of the bearing, and secured there by means of two spiral springs (48) fastened to the bracing rods (42). The other spring collar (36) is secured in a similar manner to the bottom of the bearing and supported by the washer (34), after which a coat of plaster of Paris is applied to seal any small holes or cracks which might allow the babbitt to run out.

The shaft is heated to allow the babbitt to flow freely and the molten babbitt is then poured into the form, the spring collars allowing the babbitt to flow beyond the bearing proper and to form a flange at either end of the bearing. The babbitt is then allowed to cool for ten or fifteen minutes, whereupon the spring collars are removed, the washer let down on the shaft and the latter, which is slightly tapered, as shown in Figure 4, withdrawn upwardly by turning it to the right, the thread being left-handed.

Assuming a bearing of 1-1/4 inch diameter is desired and the shaft has a diameter of 1/64 inch less than that, the next step to be taken is to insert the boring and shaving tool (33) into the slot (28). The latter tool is shown in cross-section in Figure 6, is of sufficient length to cover the whole bearing at one time so as to cut off a thin slice of the same, and is secured in the slot by means of set screws (40) inserted into countersunk holes so as not to interfere with the operation. At the lower end of the tool I provide a number of steps (51) which allow the same to be used as a bearing tool. As will be seen from the drawing, the cutting edge of the tool drags behind the force actuating it, whereby a smooth surface is secured and all chattering prevented. After this tool has been inserted in the slot, it is lowered into the bearing, set to cut off any desired amount and secured by the set screws. The shaft is then rotated and in this manner a smooth surface secured.

The scraping tool is then removed from the slot and the planing tool (31) inserted. This tool is held in place by the spring (43) which is slid down on the shaft to rest on the planing tool and prevented from upward motion by a pin inserted into the slot on top of the spring. On turning the shaft to the left, the planing tool comes in yielding contact with the top of the babbitt forming the flange and planes the same down to any desired degree. The plane and spring are then removed, the shaft lowered so as to bring the slot below the bearing, the plane inserted again upside down, the spring placed below it and supported by the washer (34), whereupon the shaft is turned to the right and the lower flange of the babbitt planed. To bevel the inner edge of the babbitt the same tool is used in the same manner with the only exception that the same is inverted during each operation, so that the bevelling edge comes in contact with the babbitt.

The bearing is now ready to be used and I have found in actual experience that in practically all the cases it makes a perfect fit and does not require any further handling or adjusting.

Assuming now that the bearing has to be larger than 1-1/4 inches in diameter, say 1-1/2 inches: In that case I first use my boring tools (32) after the spring collars have been removed. As shown in the drawing in Figure (8), this tool consists of a threaded rod adapted to be screwed into the shaft transversely of its axis and having one or two cutting edges adapted to cut a corresponding strip of metal out of the bearing as the shaft is screwed upward or downward. The threads are arranged to run 32 to the inch so that one full turn of the boring tool will cause the same to enlarge its circle a 1/16 part of an inch. One of these boring tools is screwed into the threaded hole (52) below the bearing, which I preferably use for cutting a thin slice out of the bearing so as to provide clearance between the shaft and the bearing, without putting an undue strain on the shaft. Another one of these boring tools is permanently secured in the shaft above the bearing, that is, just below the slot (28), and this tool is used to do the real work of increasing the diameter of the hole. It may cut as much as 1/4 inch of metal at a time, that is, increase the diameter by 1/2 inch, without overstraining the shaft, because there is no danger of the shaft springing, since it is pulled downward. After the size of the hole has been increased to the desired dimension, the scraping tool (33) and the planing tool (31) are used in the same manner as before.

In order to reduce the amount of boring necessary to obtain the desired size of hole, I provide the tubes (44) on the shaft (7), which are normally telescoped over each other and supported by a hinged plate (54) near the top of the shaft. The plate itself is held by a spring (56) which is adapted to yield to pressure so that the sleeves may be caused to pass it and to slide down the shaft so as to increase the diameter of the same at the place where the babbitting is to be done, so that the original hole in the bearing may be made of a size coming somewhat nearer the desired diameter.

I claim:

1. In a device for babbitting a bearing container, a supporting member, a vertical shaft screwed into the same, means for positioning the bearing container in operative relation to the shaft so as to leave an annular passage between the shaft and the container, and means adjustable along the shaft for closing the lower end of the passage.

2. In a device of the character described, a supporting member, a shaft adapted to be screwed into the same, a bearing container, means for positioning the same in operative relation with the shaft so as to leave an annular passage between the shaft and the container, a collar at either end of said container for flanging said passage and means for closing one end of said passage.

3. In a device of the character described, a supporting member, a shaft adapted to be screwed into the same, a bearing container, means for positioning the same in operative relation with the shaft so as to leave an annular passage between the shaft and the container, a yielding collar at either end of said container for flanging said passage and means for closing one end of said passage.

4. In a device of the character described, a supporting member, a shaft adapted to be screwed into the same, a bearing container, means for positioning the same in operative relation with the shaft so as to leave an annular passage between the shaft and the container, a yielding collar at either end of said container for flanging said passage and a threaded washer on said shaft adapted to be screwed against one of said collars and to thereby close one end of said passage.

5. In a device of the character described, a supporting member, a shaft adapted to be screwed into the same, a bearing container having a connecting rod thereon, means for clamping said rod parallel to the supporting member, and means for positioning the bearing container co-axially with said shaft.

6. In a device of the character described, a horizontal supporting member, a vertical member secured thereto, a vertical shaft adapted to be screwed into said horizontal member, a bearing container having a connecting rod thereon, adjustable means for holding said connecting rod parallel to the supporting member and adjustable means supported in the vertical member for positioning the bearing container with reference to the shaft.

7. In a device for babbitting a bearing container, a supporting member, a vertical shaft screwed into the same, means for positioning the bearing container in operative relation to the shaft so as to leave an annular passage between the shaft and the container, means adjustable along the shaft for closing the lower end of the passage, and a plurality of bushings on the shaft adapted for positioning within the bearing container.

ERNEST W. JONES.